Sept. 1, 1925.  1,552,085
D. W. SHIEK
TOOL HOLDING CHUCK
Filed April 2, 1921
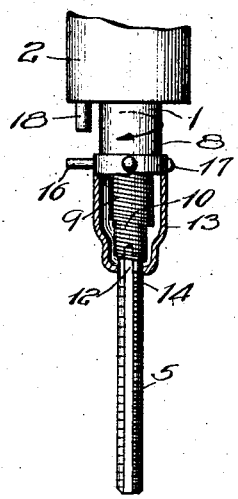
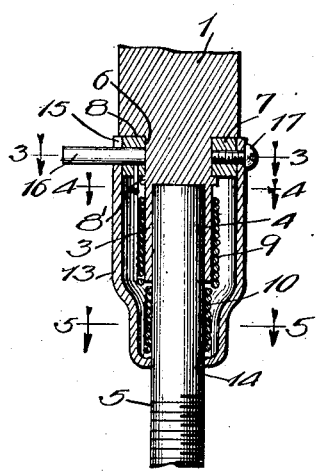
Witnesses:
W. J. Kilroy
Harry R. L. White
Inventor:
Daniel W. Shiek
By Hill & Hill
Attys.

Patented Sept. 1, 1925.

1,552,085

UNITED STATES PATENT OFFICE.

DANIEL W. SHIEK, OF AURORA, ILLINOIS, ASSIGNOR TO GRIP NUT COMPANY, OF CHICAGO, ILLINOIS, A CORPORATION OF ILLINOIS.

TOOL-HOLDING CHUCK.

Application filed April 2, 1921. Serial No. 457,989.

*To all whom it may concern:*

Be it known that I, DANIEL W. SHIEK, a citizen of the United States, residing at Aurora, in the county of Kane and State of Illinois, have invented certain new and useful Improvements in a Tool-Holding Chuck, of which the following is a description.

My invention relates to improvements in chucks and more particularly to a chuck adapted to hold rotary tools, such as drills, taps, or the like.

Among other objects of my invention, I have sought to provide a chuck which will have as few parts as practicable, and which will be simple, convenient, attractive, durable, efficient and satisfactory for use wherever found applicable.

One of the objects of my invention is to provide such a chuck which will yieldably grip the tool inserted therein, and at the same time permit of the instant removal of said tool when desired.

Another object of my invention is to provide a chuck as above described which will have a frangible connection between the tool and the chuck, whereby the frangible part will be broken when too great a resistance is offered to the rotation of the tool, and thus will prevent the breaking of the tool itself and prevent spoiling of a material being worked upon, as for instance, when the tool breaks off in a piece of material being drilled or tapped.

Another object of my invention is to provide means for automatically engaging the chuck at one limit of its movement so that the chuck will be permitted to continue its rotary drive, but will release the grip on the tool so that it may be instantly removed.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a vertical elevation, with the chuck casing partly in section;

Fig. 2 is a vertical section of the same;

Fig. 3 is a section taken substantially on the line 3—3 of Fig. 2;

Fig. 4 is a section taken substantially on the line 4—4 of Fig. 2;

Fig. 5 is a section taken substantially on the line 5—5 of Fig. 2; and

Fig. 6 is a fragmentary detail showing an auxiliary form of interengagement between the tool and tool-gripping means.

In the preferred embodiment of my invention, as shown in the drawings, 1 represents a tool-engaging end of a chuck, said chuck being rotationally mounted and longitudinally slidable in a stationary bearing sleeve 2, said sleeve being a part of a suitable stationary or a portable machine. The outer end of the chuck is preferably reduced as at 3, and has a socket 4 therein adapted to receive a suitable tool 5, the tool in the embodiment shown being a tap, though it is to be understood that the device is not limited to taps but may be used in connection with any rotary tool, such as drills or the like. Between the reduced portion of the chuck and the enlarged portion, I have provided an annular peripheral groove or recess 6 adapted to receive a ring member 7 thereon, said ring member being freely rotatable thereon but prevented from longitudinal or endwise movement by the shoulders 8 and 8' of the groove, said last mentioned shoulder being formed in any suitable way, as for instance, by peening the metal, brazing, welding or threading an annulus on the reduced portion, or by any other suitable or equivalent means for the purpose desired.

Snugly encircling the reduced portion 3 of the chuck and rotatable on its outer periphery is a tightly coiled resilient spring 9, said spring being extended beyond the end of said socket, as at 10, and coaxial therewith, but of a suitable diameter so as to snugly fit and frictionally or rotatably engage the butt end of the tool to be inserted in the socket. The upper end of said spring is preferably fixedly secured to said ring member 7, while the lower end of said spring is free. If desired, the lower end of said spring may have a slight, inwardly directed part, as at 11, and the tool may have a cooperating longitudinal part therein, as at 12, said inwardly directed end being adapted to engage with said part for a purpose to be hereinafter described.

When the chuck is rotated in a direction indicated by the arrow in Fig. 1, the coil spring will tend to frictionally grip or clamp about the tool, but if the resistance offered by the material is too great, then the spring, being relatively more frangible than the tool, will break and thus allow the tool to be removed from the work without any great harm being done. A new spring may be inserted whenever desired, in case the old one becomes worn or broken.

The diameter of the extending portion of the spring 10 is preferably of such size as to snugly fit about the tool and frictionally hold it from falling out of its own weight, and as soon as the tool meets with a slight resistance of the material being worked upon, the spring will clamp about the tool and chuck and transmit the rotational driving force therebetween. In other words, as soon as one part is rotated relative to the other, as for instance when the part 3 is rotated to the right (Fig. 1) it will cause the spring to contract about the cooperating parts and transmit the drive therebetween. As soon as either part is rotated in the other direction, the parts will rotate freely within the spring and automatically release the tool. The drive is not dependent upon whether or not the ring 7 is loose or fixed on the part 1, because the drive is transmitted by the gripping of the spring directly onto or about the parts 1 and 5. The part 7 functions only to release the drive by expanding the spring when desired, and also prevents the spring from dropping off the chuck. The end 11 of the spring may be especially desirable if there should be slight lateral play between the tool and spring, due to wear or other causes, for in that case said end would initially engage with the portion 12 of the tool upon insertion, and allow the spring to tightly coil thereabout upon rotation.

In order to enclose the working parts, to exclude dust, dirt, etc., and to provide an additional guide or bearing for the tool, I have provided a casing or sleeve 13 having a central bore 14 of a size to suitably cooperate with the tool, preferably to form a bearing, and provided with a longitudinal slot 15 at its upper end, said slot being adapted to cooperate with a radial pin 16 secured to the ring 7 and projecting beyond said sleeve, said pin being adapted to enter said sleeve when the parts are in assembled relation. Screws 17, or any other suitable or equivalent means for the purpose, may be used for securing the sleeve to the ring 7.

In order that the tool may be quickly released without stopping the rotation of the chuck, I have provided a pin or projection 18 on the stationary sleeve 2, as shown in Fig. 1, said pin being adapted to abuttingly cooperate with the pin 16 of the rotatable ring to prevent the rotational movement of the ring. Assuming that the chuck is being rotated and is slid longitudinally of the sleeve so that the pin 16 engages the pin 18, the chuck will continue to rotate, but the ring and spring will be loose on the chuck and relatively stationary because the spring will cease to exert a clamping action about the parts 3 and tool 5, and thus will permit the tool to be readily removed by simply withdrawing it from the socket. It is only when the ring 7 rotates with the chuck that a clamping grip is exerted upon the tool and thus the tool may be safely and conveniently removed from the socket when the pins 16 and 18 are in abutting relationship, even though the chuck is being constantly rotated.

This chuck is especially convenient for use with a tap for machine tapping. In that case, the tap 5 may tap a number of nuts, or the like, until the stem of the tap is completely full of tapped nuts, whereupon when the drilling pressure is released, the chuck will slide up in the sleeve until the pin 16 engages the pin 18, which engagement necessarily stops the rotation of the tap, whereupon the entire quantity of tapped nuts may be removed with the taps by a simple withdrawal of the tap, and the same tap or a new tap inserted.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned.

What I claim as new and desire to secure by Letters Patent is:

1. In combination, a tool-receiving chuck adapted to revolubly receive a tool, and resilient means carried by said chuck and contractible onto said tool and chuck for detachably securing said tool to said chuck in driving engagement therewith.

2. In combination, a rotary tool-receiving chuck, and resilient means rotatably secured on said chuck and having an extending portion to receive and automatically clamp about said tool in said chuck in one direction of rotation, and to automatically release said tool in the opposite direction of rotation.

3. In combination, a socket chuck adapted to receive a tool therein, and resilient means rotatably mounted on said chuck to engageably receive said tool and prevent the free turning of said tool in the socket in one direction of rotation and transmit drive therebetween, and to permit such turning in the opposite direction of rotation of said chuck without transmitting drive therebetween.

4. In combination, a socket chuck adapted to receive a tool therein, a coil spring about said chuck and adapted to encircle said tool, and means whereby said spring will automatically clamp about said chuck and tool in one direction of rotation and transmit drive therebetween, and will unclamp said tool in the opposite direction of rotation.

5. In combination, a rotatable chuck having a tool-receiving socket portion at one end, a coil spring about said socket and adapted to encircle a tool in said chuck, a ring member rotatable and non-slidable on said chuck, said spring having an end secured thereto whereby said spring will clamp about said chuck and tool in one direction of rotation to transmit drive therebetween and will release said tool in the opposite direction of rotation.

6. In combination, a rotatable chuck having a tool-receiving socket portion at one end, a tool having a non-circular portion on its periphery, a coil spring about said socket and adapted to encircle said tool, a ring member rotatable and non-slidable on said chuck, said spring having an end secured thereto and having its other adapted to engage said non-circular portion, whereby said spring will clamp about said chuck and tool in one direction of rotation to transmit drive therebetween and will release said tool in the opposite direction of rotation.

7. In combination, a rotatable chuck having a tool-receiving socket portion at one end, a tool having a longitudinally extending non-circular portion in its peripheral surface, a coil spring about said socket and adapted to encircle said tool, a ring member rotatable and non-slidable on said chuck, said spring having one end secured thereto, and having its other end bent so as to be engageable with said non-circular portion on the tool, whereby said spring will clamp about said chuck and tool in one direction of rotation to transmit drive therebetween and will release said tool in the opposite direction of rotation.

8. In combination, a rotatable chuck having an end socket therein to receive a suitable tool and a peripheral groove thereon intermediate said socket and body portion, a coiled spring snugly embracing said socket portion and of a size therebeyond to frictionally encircle said tool, a ring member rotatably mounted in said peripheral groove, one end of said spring being secured to said member whereby said spring will automatically clamp about said chuck and tool in one direction of rotation and transmit drive therebetween, and will release said tool in the opposite direction of rotation.

9. In combination with a stationary member, a rotatable chuck adapted to receive a tool, means for yieldably gripping said tool therein, and means engageable with said stationary member to release the grip and prevent rotation of said tool while permitting rotation of said chuck in one direction.

10. In combination with a stationary sleeve, a chuck rotatable and slidable therein and adapted to receive a suitable tool, means for yieldably gripping said tool in the chuck, and means on said chuck and engageable with said sleeve to release the grip on said tool to prevent the rotation of said tool in one direction while permitting said chuck to rotate in said direction.

11. In combination with a stationary sleeve, a chuck rotatable and slidable therein and adapted to receive a suitable tool, means for yieldably gripping said tool in the chuck, and means freely rotatable on said chuck and engageable with fixed means on said sleeve to release the grip on said tool to prevent the rotation of said tool in one direction while permitting said chuck to rotate in said direction.

12. In combination, a stationary sleeve having a fixed projection thereon, a rotatable chuck slidable in said sleeve and adapted to receive a suitable tool, a coil spring encircling said chuck and adapted to snugly encircle said tool and frictionally secure it in said chuck and to clamp thereabout to transmit drive therebetween in one direction of chuck rotation, a ring rotatably carried by said chuck, one end of said spring being secured to said ring, and the projection on said ring being engageable with the projection on said sleeve, whereby said chuck may rotate in one direction without transmitting the drive to said tool.

In testimony whereof, I have hereunto signed my name.

DANIEL W. SHIEK.